April 22, 1941.  C. L. DEWEY  2,239,413
AUTOMATIC LATHE
Filed Jan. 3, 1939
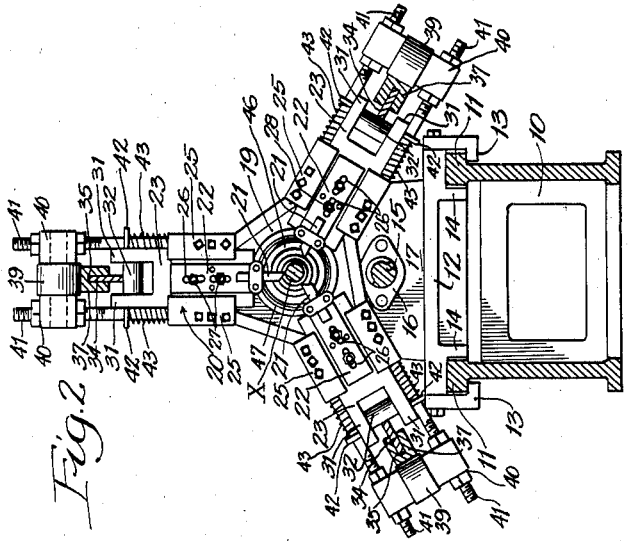
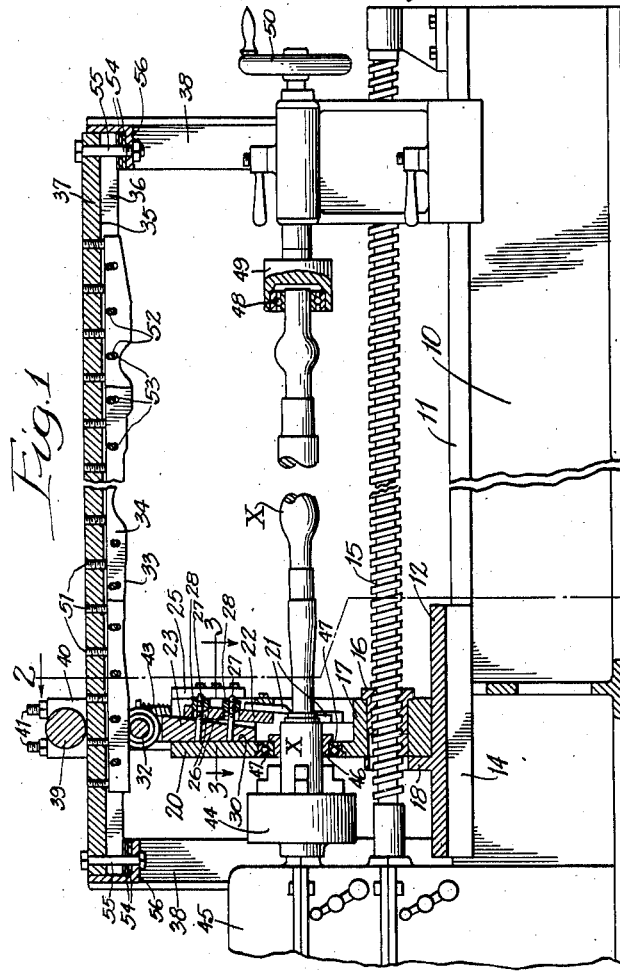
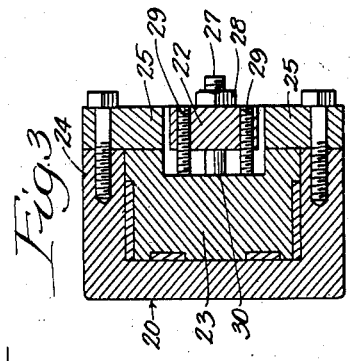
Inventor:
Clarence L. Dewey,
By Banning & Banning
Attorneys.

Patented Apr. 22, 1941

2,239,413

UNITED STATES PATENT OFFICE 2,239,413

AUTOMATIC LATHE

Clarence L. Dewey, Elkhart, Ind.

Application January 3, 1939, Serial No. 248,934

6 Claims. (Cl. 82—14)

The lathe of the present invention is designed to cut down the surface of a rod or bar to any desired configuration by the operation of a group of cutting tools which act in succession upon the surfaces of the rod or bar and cut the same to the desired depth in conformity with the configuration of a template which controls the in and out movements of the tools.

In particular the invention relates to the means provided for supporting the rod or bar at a point immediately adjacent to the cutting tools and in sufficiently close proximity thereto to support the rod or bar against the thrust of the cutting tools and thus insure accuracy in cutting to the desired configuration.

The invention also relates to the means for mounting the cutting tools and advancing the same along the rod or bar in the progress of the work, and to the construction and arrangement of the template and means provided for holding the cutting tools into close and accurate relation thereto.

The invention further relates to the general structure of the machine as a whole and to the various mechanisms in their combined relationship to one another.

Further objects and details will appear from the description of the invention in conjunction with the accompanying drawing, wherein—

Figure 1 is a sectional elevation of the machine partially broken away in the center;

Fig. 2 is a cross sectional view taken on line 2—2 of Fig. 1; and

Fig. 3 is a sectional detail of the mounting for one of the cutting tools taken on line 3—3 of Fig. 1.

The machine as a whole is mounted upon a bed or frame 10 provided along its upper edges with carriage slide rails 11 which serve to mount a carriage 12 having on each side an L-shaped guide bar 13 which hooks under the edge of the associated rail and coacts with an inner guide flange 14 in holding the carriage firmly for travel along the rails. The carriage is fed forwardly by a feed screw 15 which is threaded through a bushing 16 carried by a block 17 mounted upon the carriage and bearing against a cross flange or abutment 18.

The block 17 constitutes the lower portion of a rugged frame 19 comprising three radiating arms 20 which furnish the supports for three cutting tools 21 equidistantly arranged and standing at angles of approximately 120° from one another.

The three cutting tools are arranged in a stepped series: the first tool standing in the most advanced position; the second tool slightly to the rear, and the third in the rearmost position. The longitudinal variation of the tools, however, is slight, so that they will act conjointly upon a section of the rod or bar subjected to the cutting operation and produce therein a stepped cut by stages to the maximum depth to which the rod is being currently cut away. That is to say, the most advanced tool will make a relatively shallow cut; the second tool will deepen the cut slightly, and the last tool will complete the cut to the maximum depth.

Fig. 1 illustrates the first and last tools of the group showing the minimum and maximum cuts and the stepped relation of the cuts to one another in imparting the desired configuration. Each of the three cutting tools of the group is carried by a tool holder 22 which in turn is mounted upon the beveled face of a slide block 23 mounted within guideways afforded by side flanges 24 on the radiating arm 20, to which are bolted overhanging guide plates 25, which arrangement permits the slide block 23 to move radially or toward and from the axis of the rod or bar undergoing cutting.

The tool holder 22 is provided with radially elongated slots 26 through which are entered bolts 27 carrying hemi-spherical nuts 28 which bear against the edges of the slots, and these nuts act in conjunction with thrust screws 29 entered through the tool holder and bearing against the base 30 of a sloping groove or channel formed in the face of the slide block. The arrangement is one which permits the tool holder to be adjusted radially to a limited degree and also to be adjusted longitudinally to the degree requisite to bring the point of the cutting tool to the desired position, so that the three tools composing the series may be individualy adjusted to the stepped relation required in progressively cutting the material to the desired depth.

Each slide block 22 is provided on its outer end with spaced ears of lugs 31, between which is journalled a roller 32 adapted to roll upon the configured inner edge 33 of a template 34, which affords the pattern for guiding the tool in imparting to the work the desired configuration. Each configured template is in the form of a relatively thin plate, or series of sections forming in effect a continuous plate, and held or clamped within a groove 35 formed between spaced side walls 36 depending from a rigid mounting bar 37 suitably supported upon standards 38 secured to the main frame or bed of the machine.

In order to support the template and its mounting against bending or spreading under the thrust of the slide block with its roller 32, the template and mounting are reinforced by a backing roller 39 journalled between spaced bearing blocks 40 mounted upon rods 41 which outwardly project from the radiating arm 20 which carries the slide block. Since the outer edge of the template mounting extends in truly parallel relation to the axis of rotation for the work and affords a bearing surface for the travel of the backing roller 39, it is evident that the backing roller will serve to prevent yielding or springing of the template and mounting and hold these parts in accurate relation to serve as a guide for the radial movements imparted through the roller 32 to the slide block 39.

In order to normally hold the slide block and tool holder in the outermost or retracted position, each of the lugs 31 is provided with a flange 42 which encircles the associated rod 41 and receives the thrust of a coil spring 43. It will be understood that the mechanisms above described, including the tool mountings and template and associated parts, are arranged in triplicate, as indicated in Fig. 2.

The rod or bar X constituting the work is rigidly clamped and held at its forward end within a head chuck 44 which is rotated at the desired speed by a motor 45, which also through suitable reduction gearing rotates the feed screw 15 to advance the carriage at the proper ratio with respect to the rotation of the work.

The rod or bar X is supported immediately in advance of the cutting point by a bushing 46 through which the rod or bar is entered, which bushing is carried by ball bearings 47 in the center of the frame 19, and this arrangement permits rods or bars of variable cross section to be cut by selecting a bushing having an aperture of the desired size and configuration to fit the bar, whether round, hexagonal, or what not. The tail end of the rod or bar X is supported within a tail stock bearing 48 in the tail stock support 49, which may be adjusted longitudinally by a hand wheel 50.

The templates may be accurately adjusted within the grooved template holder bars 37 by means of adjusting screws 51 which coact with cross bolts 52 entered through elongated slots 53 in the template, so that slight or fine adjustments can be effected to bring the acting edge of the template into the exact relation required. Adjustments of the template as a whole may be effected by the use of shims 54 in conjunction with bolts 55 entered through angle brackets 56 on the standards 38 which support the ends of the template holder, so that the holder as a whole can be raised or lowered slightly as occasion may require.

Operation

In preparing the machine for operation, a set of templates is first mounted and adjusted, one for each of the cutting tools, so as to impart the desired radial movements thereto. Thereafter, the three cutting tools are adjusted to project in varying degree toward the axis of the work and at the varying longitudinal positions required in stepping down the cut in the manner previously described. Thereafter, the carriage is run back to the tail stock end of the machine, and if the cutting is to begin at the extreme tail end of the rod or bar the tail stock is turned back to afford clearance for the positioning of the cutting tools with respect to the exposed end of the work. On the other hand, if the cutting is not to begin at the extreme end, the tail end of the work is entered through the tail stock bearing before the cutting begins.

In either event, when power is applied to the machine, the carriage will begin to travel forwardly under the action of the feed screw 15, and as soon as the carriage advances sufficiently to encounter the configured portions of the templates the cutting tools will begin to move inwardly in varying degrees so that the cutting will begin; the foremost tool will initiate the cutting to a relatively slight depth; the second tool will increase the depth, and the third tool will again increase the depth to a maximum degree.

The longitudinal spacing of the tools will be properly adjusted with regard to the speed of rotation imparted to the work and in ratio to the speed of advance of the carriage, so that the attack of each of the tools will be along a low pitched spiral line with relation to the axis of the rod or bar constituting the work, which line is the resultant of the forward advance of the tool as it cuts into the surface of the rotating work, which of course is held against longitudinal displacement under the thrust of the advancing tools. The work itself is firmly held and supported by the bushing 46 immediately in advance of the cutting point, so that there can be no yielding of the work under the thrust of the tools, which thrust, however, is distributed upon three points about the axis of the work, which compensates against an excessive side thrust at any one point.

The machine as a whole is compactly and ruggedly constructed so that heavy work may be rapidly and accurately performed and any desired configuration given to the surface without attention on the part of the operator after the templates have been properly set and the tools adjusted.

Although three tools are employed in the particular embodiment of the invention here shown and described, it will be understood that it is not the intention to limit the invention to the particular arrangement shown, since a single tool may be advantageously employed under certain circumstances, or two tools or a greater number than three may be employed, without substantial change in the general structure of the machine as a whole.

It will also be understood that in the claims where reference is made to the movement of the tools longitudinally with respect to the work, this refers to relative rather than absolute movement of the parts in question.

I claim:

1. In a lathe, the combination of a work holder and means for rotating the same, a carriage and means for moving the carriage longitudinally with respect to the axis of the work, a plurality of radially extending members carried by the carriage, a tool holder slidably mounted for radial movement with respect to the axis of the work upon each of said members, and a tool carried by each of said tool holders, the respective tools extending inwardly in progressively greater degree toward the axis of the work and standing in a progressive sequence longitudinally of the work to cut into the surface of the work in stepped relation to the point of greatest depth of cut, and an elongated configured template extending parallel to the axis of the work and associated with each of the tool holders and having coacting relation therewith to move each individual tool holder radially in conformity with a predetermined sequence of movements, and to maintain the respective tools in the desired progressively increasing approach toward the axis of the work.

2. In a lathe, the combination of means for holding and rotating the work, a carriage and means for moving the carriage longitudinally of the work, a plurality of radially disposed members mounted upon the carriage, each of said members being provided with a guideway disposed radially to the axis of the work, a slide block mounted in each of said guideways, a tool holder carried by each of said slide blocks and adjustable radially and longitudinally with respect to the axis of the work, and a tool carried by each of said tool holders, the respective tools extending to a progressively greater degree inwardly toward the axis of the work and in progressive sequence longitudinally of the work for incutting the surface of the work by a stepped series of cuts, a roller carried by each of the slide blocks, and an elongated template for each of the rollers fixedly mounted in parallel relation to the axis of the work and provided with an inner acting edge for imparting the desired radial movements to the roller, and especially configured to maintain the associated tools in the desired progressively increasing approach toward the axis of the work.

3. In a lathe, the combination of means for holding and rotating the work, a carriage and means for moving the carriage longitudinally of the work, a plurality of radially disposed members mounted upon the carriage, each of said members being provided with a guideway disposed radially to the axis of the work, a slide block mounted in each of said guideways, a tool holder carried by each of said slide blocks and adjustable thereon radially and longitudinally with respect to the axis of the work, and a tool carried by each of said tool holders, the respective tools extending to a progressively greater degree inwardly toward the axis of the work and in progressive sequence longitudinally of the work for incutting the surface of the work by a stepped series of cuts, a roller carried by each of the slide blocks, and a template for each of the rollers provided with a suitably configured acting edge for imparting the desired radial movements to the roller, a holder for each of the templates, each holder being provided with an outer surface lying in parallel relation to the axis of the work, and a backing roller carried by each of the radially extending carriage members and riding upon the parallel surface of the template holder for reinforcing the latter against the thrust of the first mentioned roller while riding upon the configured surface of the template.

4. In a lathe, the combination of means for holding and rotating the work, a carriage and means for moving the carriage longitudinally of the work, a plurality of radially disposed members mounted upon the carriage, each of said members being provided with a guideway disposed radially to the axis of the work, a slide block mounted in each of said guideways, a tool holder carried by each of said slide blocks and adjustable thereon radially and longitudinally with respect to the axis of the work, and a tool carried by each of said tool holders, the respective tools extending to a progressively greater degree inwardly toward the axis of the work and in progressive sequence longitudinally of the work for incutting the surface of the work by a stepped series of cuts, a roller carried by each of the slide blocks, and a template for each of the rollers provided with a suitably configured acting edge for imparting the desired radial movements to the roller, a holder for each of the templates and means for adjusting the template within said holder, each holder being provided with an outer surface lying in parallel relation to the axis of the work, and a backing roller carried by each of the radially extending carriage members and riding upon the parallel surface of the template holder for reinforcing the latter against the thrust of the first mentioned roller while riding upon the configured surface of the template.

5. In a lathe, the combination of means for holding the work to be acted upon, a plurality of tool holders standing in spaced relation circumferentially with respect to the position occupied by the work, means for advancing the tool holders as a group relatively longitudinally with respect to the work, a cutting tool carried by each of the tool holders, the cutting tools standing in spaced relation to one another longitudinally and in progressively stepped relation radially of the work axis and in position to progressively cut the work by steps to the desired depth, means for imparting relative rotation between the group of tools and the work holder, means for automatically moving the tool holders radially with respect to the work axis to impart the desired configuration to the surface of the work, and a supporting member surrounding the work closely in advance of the tools and movable with the group of tool holders longitudinally with respect to the work.

6. In a lathe, the combination of means for holding the work to be acted upon, a plurality of tool holders standing in spaced relation circumferentially with respect to the position occupied by the work, means for advancing the tool holders as a group relatively longitudinally with respect to the work, a cutting tool carried by each of the tool holders, the cutting tools standing in spaced relation to one another longitudinally and in progressively stepped relation radially of the work axis and in position to progressively cut the work by steps to the desired depth, means for imparting relative rotation between the group of tools and the work holder, an elongated template for each of the tool holders, provided with an acting edge having a configuration corresponding to the intended surface of the work, means connected with the associated tool holder and rotating upon the configured edge of the template for imparting radial movements to the tool holder to cut the work to a surface configuration conformable to the template, and a supporting member surrounding the work closely in advance of the tools and movable with the group of tool holders longitudinally with respect to the work.

CLARENCE L. DEWEY.